No. 895,608. PATENTED AUG. 11, 1908.
A. A. ABBOT.
SEPARABLE FASTENER.
APPLICATION FILED AUG. 16, 1907.
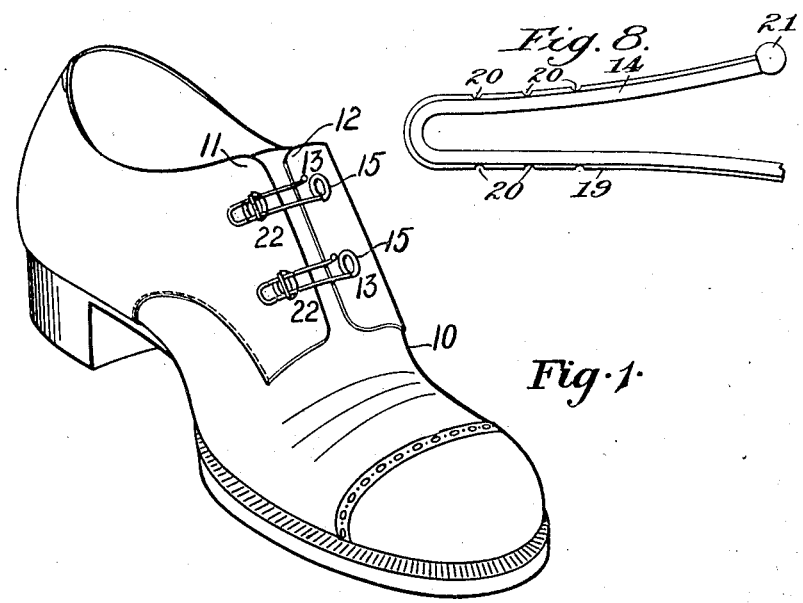
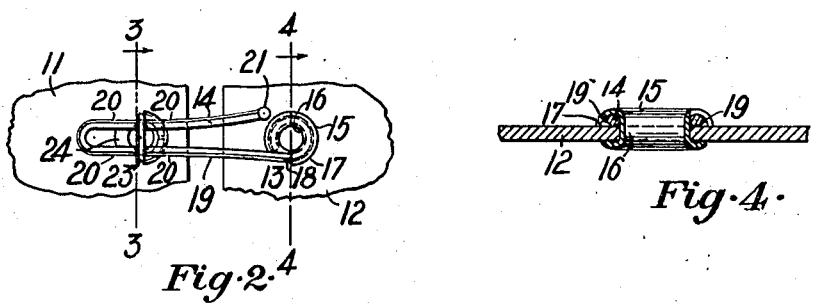
Witnesses:
Walter L. Pierce
Ernest A. Telfer
Inventor:
Andrew A. Abbot.
by his Atty. Charles S. Gooding.

UNITED STATES PATENT OFFICE.

ANDREW A. ABBOT, OF BOSTON, MASSACHUSETTS.

SEPARABLE FASTENER.

No. 895,608.    Specification of Letters Patent.    Patented Aug. 11, 1908.

Application filed August 16, 1907. Serial No. 388,749.

*To all whom it may concern:*

Be it known that I, ANDREW A. ABBOT, a citizen of the United States, residing at Boston, in the county of Suffolk and State of Massachusetts, have invented new and useful Improvements in Separable Fasteners, of which the following is a specification.

This invention relates to improvements in separable fastening devices for fastening together two parts such as the adjacent edges of the upper of a boot or shoe, and the object is to provide a strong, simple device for fastening together the adjacent edges of the shoe upper, the members of said device being adapted to be readily attached to each other when desired.

The invention consists in the combination and arrangement of parts set forth in the following specification and particularly pointed out in the appended claims.

Referring to the drawings: Figure 1 is a perspective view of a shoe showing my improved separable fastening device thereon. Fig. 2 is an enlarged plan of the same, the upper of the shoe being broken away to save space. Fig. 3 is an enlarged detail sectional elevation taken on line 3—3 of Fig. 2, looking toward the right. Fig. 4 is an enlarged detail sectional elevation taken on line 4—4 of Fig. 2, looking toward the right. Fig. 5 is a detail plan of the left hand eyelet or tubular rivet before being assembled with its U-shaped wire. Fig. 6 is a detail plan of the right hand eyelet or tubular rivet before being assembled with its U-shaped member. Fig. 7 is a detail perspective view of the U-shaped wire member which is to be assembled with the eyelet or tubular rivet shown in Fig. 5. Fig. 8 is an enlarged detail plan of a portion of the male member.

Like numerals refer to like parts throughout the several views of the drawings.

In the drawings, 10 is a shoe provided with two tabs 11 and 12. A male member 13 comprising a U-shaped wire 14 having two legs and a rivet 15 which is preferably of the tubular type is fast to the tab 12, said rivet passing through said tab, the median axial line of said rivet extending transversely of a plane containing the median lines of said legs. The legs of the U-shaped wire 14 are relatively movable substantially at right angles to the median axial line of the rivet 15. The rivet 15 has a tubular shank 16 and a downwardly turned flange 17, said flange being preferably provided with a notch 18. One end of the U-shaped wire 14 is wound around the shank 16 and extends outwardly from said shank through the notch 18, the outwardly turned flange 17 at the sides of the notch 18 serving to lock the wire 14 against rotation with relation to the rivet 15. The wire 14 is preferably provided with a fin or rib 19 extending therearound, said rib being provided with a plurality of notches 20 oppositely arranged in pairs. The free end of the wire 14 is preferably provided with a rounded portion or ball 21. The female member 22 consists of a substantially U-shaped wire 23 and a rivet 24 which is preferably of the tubular type, said rivet having a hollow shank 25 and a downwardly turned flange 26, said flange being provided with two oppositely located notches 27. The legs 28, 28 of the U-shaped wire 23 are bent horizontally to form a substantially semi-circular portion 29. The wire 23 is assembled with the rivet 24 and the tubular shank 25 of said rivet is inserted in a hole punched in the tab 11 and the lower end of said shank is then expanded or spread out in any usual or desired manner. The wire 19 and the rivet 15 are assembled and attached to the tab 12 in a similar manner, The general operation of the device is as follows: Assuming the parts to be in the position shown in Figs. 1 and 2 and it is desired to take off the shoe, the end 21 of the wire 14 is pressed toward the other side with the fingers, thereby disengaging the notches 20 from the sides or legs 28 of the wire 23, whereupon the male member 13 is withdrawn from the female member 22. The parts are then secured together by a reversal of the foregoing operation. It will be seen that by providing the rib or fin 19 the cutting of the notches 20 in the wire 14 does not weaken said wire because said notches are equal in depth to said rib.

The device being very small and compact and arranged very close to the shoe, there are no projecting parts to catch on the clothing.

Any other manner of securing the wires to their respective rivets may be employed if desired, and I do not limit myself to the specific manner of attachment herein shown.

Having thus described my invention, what I claim and desire by Letters Patent to secure is:

1. In a separable fastening device, a female member and a male member adapted to enter said female member, said male member comprising a U-shaped member having two legs adapted to engage opposite sides, respectively, of said female member, one of said legs provided with serrations and a rivet to which one of said legs is fast, the median axial line of said rivet extending transversely of a plane containing the median lines of said legs.

2. In a separable fastening device, a female member and a male member adapted to enter said female member, said male member comprising a U-shaped wire having two legs provided with oppositely arranged serrations adapted to engage opposite sides respectively, of said female member, and a rivet having a shank around which one of said legs extends.

3. In a separable fastening device, a female member and a male member adapted to enter said female member, said male member comprising a U-shaped wire having two legs provided with oppositely arranged serrations adapted to engage opposite sides respectively, of said female member, and a rivet having a tubular shank around which one of said legs extends.

4. In a separable fastening device, a female member and a male member adapted to enter said female member, said male member comprising a U-shaped wire having two legs adapted to engage opposite sides, respectively, of said female member, one of said legs provided with serrations, and a rivet having a shank around which one of said legs extends.

5. In a separable fastening device, a female member and a male member adapted to enter said female member, said male member comprising a U-shaped wire having two legs provided with oppositely arranged serrations adapted to engage opposite sides, respectively, of said female member, and a rivet to which one of said legs is fast, said rivet having a tubular shank.

6. In a separable fastening device, a female member and a male member adapted to enter said female member, said male member comprising a U-shaped wire provided with a rib extending longitudinally thereof, said rib provided with serrations adapted to engage said female member, and a rivet to which said wire is fast.

7. In a separable fastening device, a female member and a male member adapted to enter said female member, said male member comprising a U-shaped wire having two legs adapted to engage opposite sides, respectively, of said female member, and a rivet having a shank and a downwardly turned flange provided with a notch, a portion of said wire extending around said shank and engaging the sides of said notch.

8. In a separable fastening device, a female member and a male member adapted to enter said female member, said male member comprising a U-shaped member having two relatively movable legs adapted to engage opposite sides, respectively, of said male member, one of said legs provided with notches, and a rivet to which one of said legs is fast, said legs being relatively movable transversely of the median axial line of said rivet.

In testimony whereof I have hereunto set my hand in presence of two subscribing witnesses.

ANDREW A. ABBOT.

Witnesses:
LOUIS A. JONES,
ANNIE J. DAILEY.